United States Patent
Masamoto et al.

(10) Patent No.: US 7,484,877 B2
(45) Date of Patent: Feb. 3, 2009

(54) LIGHT EMITTING DEVICE AND LIQUID CRYSTAL DEVICE

(75) Inventors: Taketoshi Masamoto, Matsumoto (JP); Kazunari Sato, Matsumoto (JP)

(73) Assignee: Epson Imaging Devices Corporation (JP)

( * ) Notice: Subject to any disclaimer, the term of this patent is extended or adjusted under 35 U.S.C. 154(b) by 0 days.

(21) Appl. No.: 11/733,338

(22) Filed: Apr. 10, 2007

(65) Prior Publication Data
US 2008/0055925 A1 Mar. 6, 2008

(30) Foreign Application Priority Data
May 12, 2006 (JP) ............................. 2006-133683

(51) Int. Cl.
*F21V 8/00* (2006.01)
(52) U.S. Cl. ................. 362/631; 362/621; 362/613; 362/615; 362/612
(58) Field of Classification Search ............... 362/611, 362/612, 613, 600, 631, 27, 555, 545, 632–634, 362/621, 615, 625, 628; 349/61, 65, 68–69
See application file for complete search history.

(56) References Cited

U.S. PATENT DOCUMENTS

| | | | |
|---|---|---|---|
| 7,036,946 B1 * | 5/2006 | Mosier | 362/27 |
| 7,344,292 B2 * | 3/2008 | Kim | 362/612 |
| 2004/0080924 A1 * | 4/2004 | Chuang | 362/27 |
| 2007/0253218 A1 * | 11/2007 | Tanabe | 362/612 |

FOREIGN PATENT DOCUMENTS

| | | |
|---|---|---|
| JP | 09-237514 | 9/1997 |
| JP | 11-162232 | 6/1999 |
| JP | 2004-079488 | 3/2004 |
| JP | 2004-184493 | 7/2004 |
| JP | 2004-349143 | 12/2004 |
| JP | 2005-174820 | 6/2005 |
| JP | 2006-134661 | 5/2006 |
| WO | WO 2006027883 | * 3/2006 |

* cited by examiner

*Primary Examiner*—Jong-Suk (James) Lee
*Assistant Examiner*—Robert May
(74) *Attorney, Agent, or Firm*—Harness, Dickey & Pierce, P.L.C.

(57) ABSTRACT

A light emitting device includes a light source and a light guide body having a light guiding surface from which light emitted from the light source is received and having a light emitting surface from which the received light is emitted. A plurality of rows of light source arrays each formed by a plurality of the light sources are provided on the light guiding surface.

7 Claims, 7 Drawing Sheets

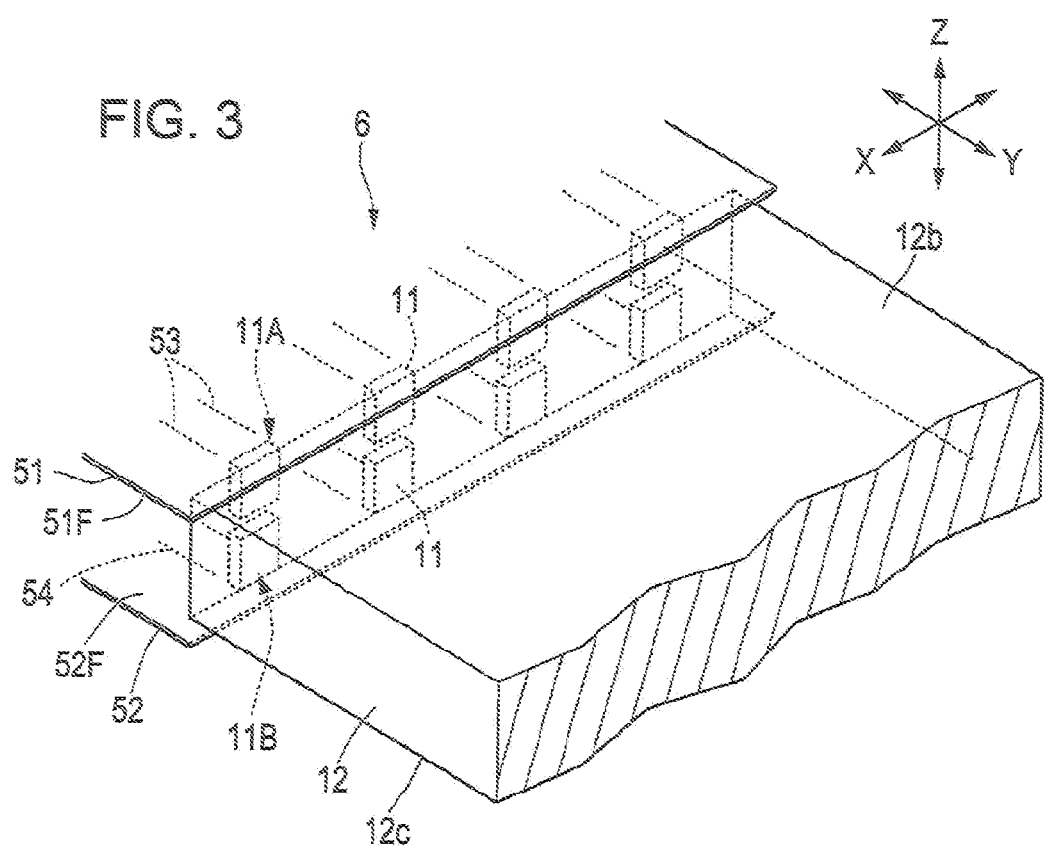
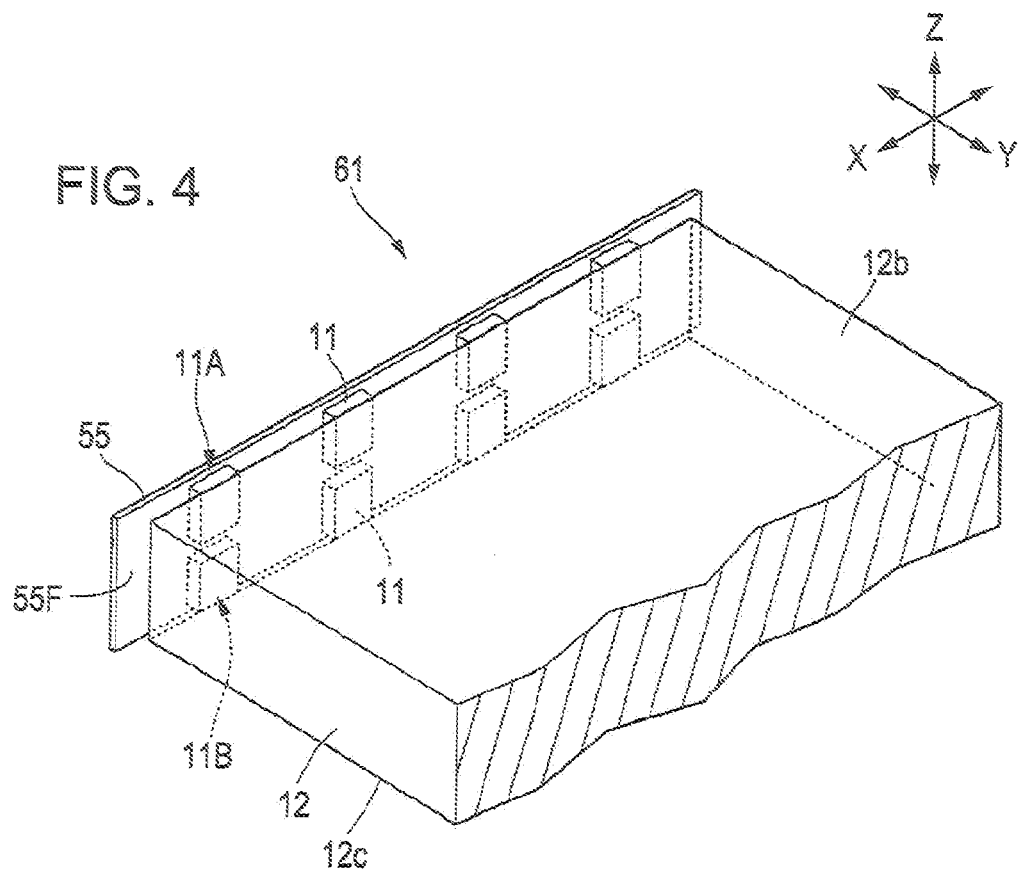

LIGHT EMITTING DEVICE AND LIQUID CRYSTAL DEVICE

The entire disclosure of Japanese Patent Application No. 2006-133683, filed May 12, 2006 is expressly incorporated by reference herein.

BACKGROUND

1. Technical Field

The present invention relates to a light emitting device for emitting an emission object in a planar manner and a liquid crystal device constructed by using the same.

2. Related Art

A liquid crystal device is now widely used in a household television, a PC monitor, and another various electronic apparatuses. As for the liquid crystal device, a liquid crystal device having a structure in which light from a point light source or a line light source is converted into surface light to emit the surface light to a liquid crystal panel for display has been known. An LED (Light Emitting Diode) is often used as for the point light source, and a cold-cathode tube is often used as for the line light source. The cold-cathode tube has a fear of break and is hard to handle because of using a glass tube. In addition, the LED is eco friendly than the cold-cathode tube, so that the LED has been getting widely used as a light source of the liquid crystal device in recent days (for example, see JP-A-2004-79488 (hereinafter, referred to as Patent document 1)).

However, even though luminance has been improved by recent technical innovations, the LED which can provide high luminance for use in a big size monitor has not been provided. In Patent Document 1, luminance is improved by disposing the LEDs on a plurality of edge surfaces of a light guide body. However, there is a problem in that such a disposal of the LEDs on a plurality of the edge surfaces increases the setting area of the LEDs to prevent reduction of space. In addition, the number of circuit substrates for mounting the LEDs is increased, which increases manufacturing cost.

SUMMARY

An advantage of some aspects of the invention is that it provides a light emitting device which makes it possible to emit flat light having high luminance. Further, a liquid crystal device in which even and bright display can be realized by equipping such a light emitting device is provided.

In order to solve the above problems, a light emitting device of the invention includes a light source, and a light guide body for receiving light emitted from the light source from a light guiding surface to emit from a light emitting surface. A light source array formed by a plurality of the light sources is provided on the light guiding surface, and a plurality of rows of the light source arrays are provided on the light guiding surface.

With the configuration, more light sources can be disposed on the light guiding surface of the light guide body, so that high luminance surface emission can be provided as compared with the conventional light emitting device. In addition, the plurality of light sources are gathered in one place, so that reduction of space can be achieved. Further, by assembling the plurality of the light sources in one place, the light sources can be provided on one circuit substrate, so that the number of the components can be reduced.

In the invention, it is preferable that the plurality of the light source arrays are provided on one circuit substrate.

With the configuration, all of the light sources are disposed on the one circuit substrate, so that the number of the components is reduced and cost reduction is achieved.

In the invention, it should be possible that the plurality of light source arrays provided on the light guiding surface includes a first light source array and a second light source array, the first light source array is provided on a first circuit substrate, the second light source array is provided on a second circuit substrate, and the first circuit substrate and the second circuit substrate are opposed with the first light source array and the second light source array interposed therebetween.

With the configuration, the surfaces on which the first light source array of the first circuit substrate and the second light source array of the second circuit substrate are disposed are oriented in the different direction, so that when the surfaces are limited to orient in the same direction due to a mounting problem, the configuration can be employed. For example, when the first light source array and the second light source array are mounted on the one circuit substrate and the surface on which the light source arrays are disposed is bent toward the light guiding surface of the light guide body, the configuration can be employed because directions of the surfaces on which the first light source array and the second light source array are disposed are alternatively different.

In the configuration, it is preferable that the light sources of the first light source array and the light sources of the second light source array are alternately misaligning in an arrangement direction of the light sources.

With the configuration, formation of a high luminance region due to overlapping of optical axes in the light guide body is prevented and even illumination having little luminance unevenness in the whole light guide body can be provided.

Further, it is preferable that the light sources of the first light source array and the light sources of the second light source array are disposed so as to be partly overlapped when viewed from the array direction of the light sources.

With the configuration, the thickness of the light guide body can be reduced.

In the invention, it is preferable that the first circuit substrate and the second circuit substrate are constituted by one circuit substrate.

With the configuration, the first circuit substrate and the second circuit substrate are constituted as the one circuit substrate, so that the number of the components is reduced.

In the present invention, it is preferable an edge of the first circuit substrate is fixed on the light emitting surface of the light guide body and an edge of the second circuit substrate is fixed on the surface opposite to the light emitting surface of the light guide body.

With the configuration, the first circuit substrate, the second circuit substrate, and the light guide body can be integrally fixed, so that accuracy of the misalignment of each member or the like can be enhanced as compared with the case where these are respectively fixed.

In the invention, it should be possible that the plurality of light source arrays provided on the light guiding surface includes a first light source array and a second light source array, the first light source array is provided on one surface of one circuit substrate, and the second light source array is provided on the other surface of the one circuit substrate.

With the configuration, all of the light sources are disposed on the one circuit substrate, so that the number of the components is reduced and cost reduction is achieved.

In the invention, it is preferable that an edge of the one circuit substrate is fixed to an inner surface of a groove provided on the light guiding surface of the light guide body.

With the configuration, the circuit substrate and light guide body can be integrally fixed, so that accuracy of the misalignment of each member or the like can be enhanced as compared with the case where these are respectively fixed.

In the invention, it should be possible that the plurality of light source arrays provided on the light guiding surface includes a first light source array and a second light source array, the first light source array is provided on a first circuit substrate, the second light source array is provided on a second circuit substrate, and the first light source array and the second light source array are opposed to each other with the second circuit substrate interposed therebetween.

With the configuration, the surfaces on which the first light source array of the first circuit substrate and the second light source array of the second circuit substrate are disposed are oriented in the different direction, so that, for example, when the surfaces are limited to orient in the same direction due to a mounting problem, the configuration can be employed.

In the invention, it is preferable that an edge of the first circuit substrate is fixed on the light emitting surface of the light guide body and an edge of the second circuit substrate is fixed to an inner surface of a groove provided on the light guiding surface of the light guide body.

With the configuration, the first circuit substrate, the second circuit substrate, and the light guide body can be integrally fixed, so that accuracy of the misalignment of each member or the like can be enhanced as compared with the case where these are respectively fixed.

A liquid crystal device of the invention includes the light emitting device of the invention described above and a liquid crystal panel oppositely disposed to the light emitting surface of the light emitting device.

With the configuration, a liquid crystal device which allows even and bright display can be provided.

BRIEF DESCRIPTION OF THE DRAWINGS

The invention will be described with reference to the accompanying drawings, wherein like numbers reference like elements.

FIG. 3 is an enlarged fragmentary view of a light emitting device equipped in the liquid crystal device.

FIG. 4 is an enlarged fragmentary view of a light emitting device according to a second embodiment of the invention.

DESCRIPTION OF EXEMPLARY EMBODIMENTS

Figure 1:
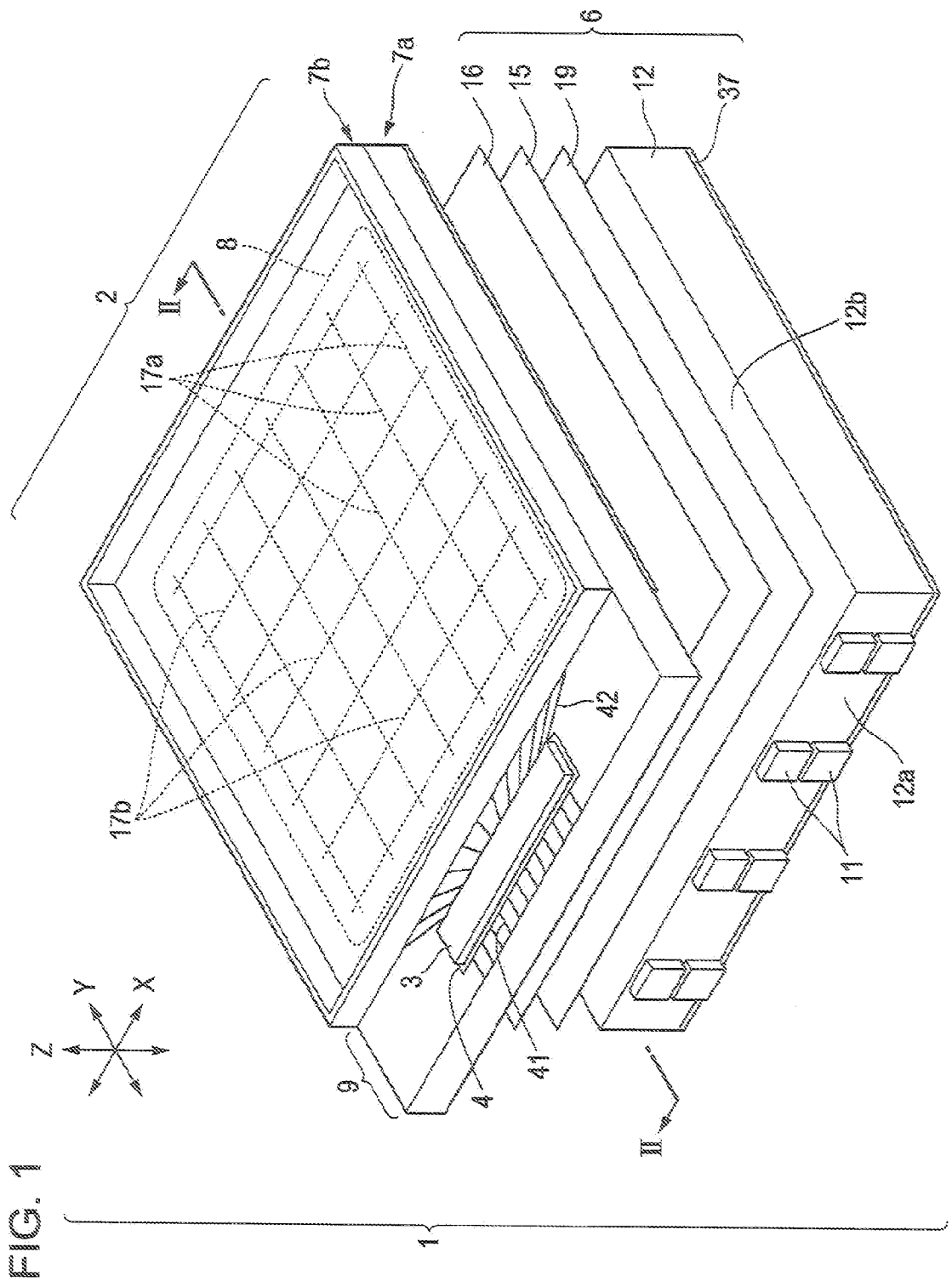
FIG. 1 is a disassembly perspective view of a liquid crystal device according to a first embodiment of the invention.

Hereinafter, embodiments of the invention will be described with reference to the accompanying drawings. In the drawings below, directions parallel to a display surface of a liquid crystal device shall be X axis direction and Y axis direction, and a direction perpendicular thereto shall be Z axis direction. The X axis direction and the Y axis direction respectively correspond to extending directions of wires or electrodes formed in a grid manner and the Z axis direction corresponds to a direction to which light from the light emitting device is emitted (observation direction). Further, for a better understanding of each structure, scale, number, and the like are different in each structure from that of the real structure.

First Embodiment

Figure 2:
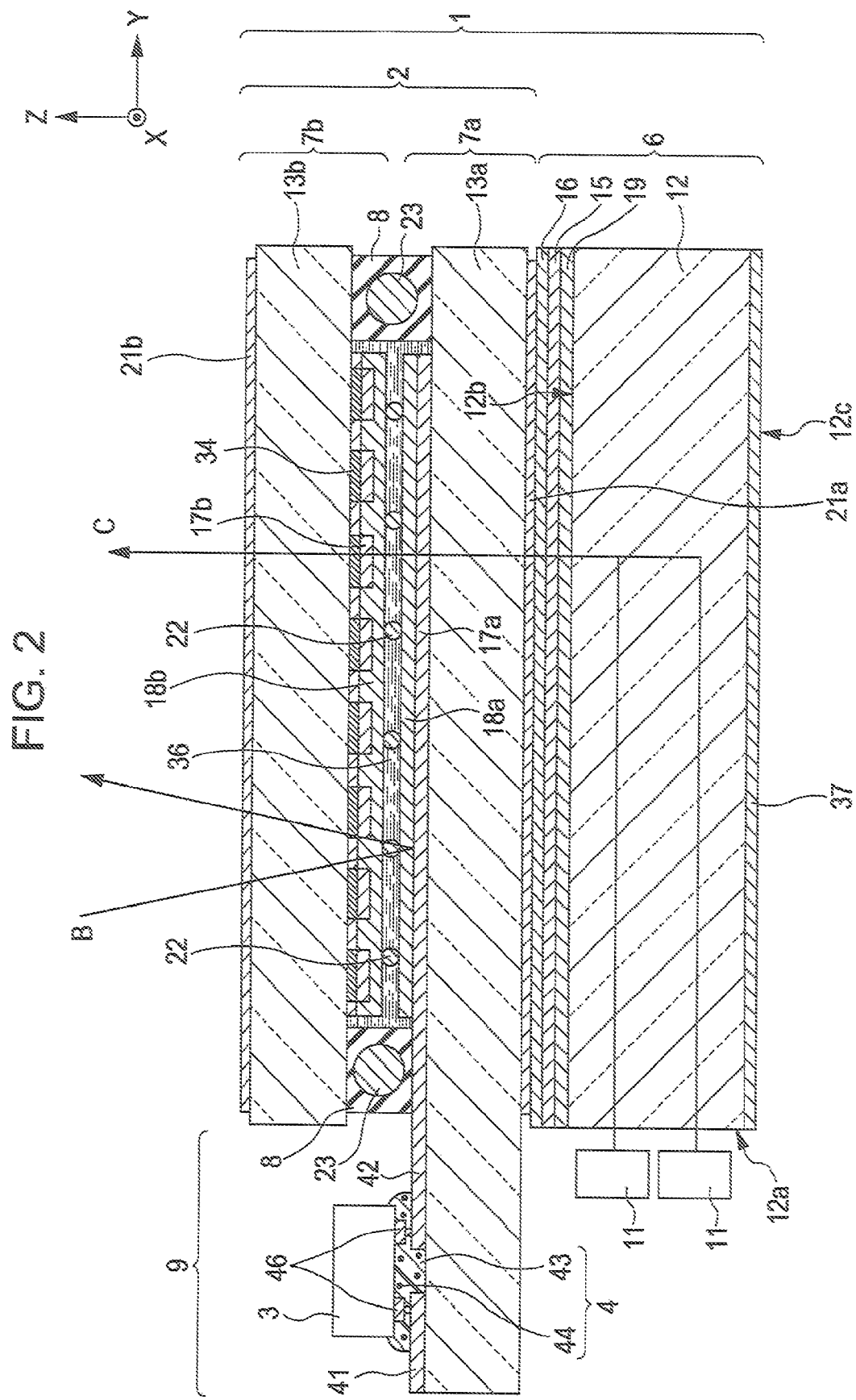
FIG. 2 is a cross-sectional view taken along the line II-II of FIG. 1.

FIG. 1 is a perspective view schematically showing a liquid crystal device according to a first embodiment of the invention, FIG. 2 is a cross-sectional view taken along the line II-II of FIG. 1, and FIG. 3 is an enlarged fragmentary view of the light emitting device in FIG. 1. As shown in FIG. 1, the liquid crystal device 1 includes a liquid crystal panel 2 which is an electro optical panel, a driving IC 3 electrically connected to the liquid crystal panel 2, a light emitting device 6 for emitting light to the liquid crystal panel 2, and the like. Here, an auxiliary mechanism such as a flame and the like is provided as needed although omitted in FIG. 1.

The liquid crystal panel 2 is formed by bonding a first substrate 7a and a second substrate 7b with annular sealing materials 8. Here, the sealing material 8 are formed on any one of the first substrate 7a and the second substrate 7b. The first substrate 7a is equipped with an extending portion 9 extending outside of the second substrate 7b and the driving IC 3 is mounted on the extending portion 9 by a conductive adhesion element, for example, an AFC (Anisotropic Conductive Film) 4.

In FIG. 2, a space maintained by spacers 22 and conductive materials 23 so cold cell gap is formed between the first substrate 7a and the second substrate 7b bonded by the sealing materials 8. Liquid crystal is enclosed into the cell gap to constitute a liquid crystal layer 36. The spacers 22 are granular members dispersed on the first substrate 7a or the second substrate 7b. In addition, the conductive materials 23 are conductive granular members mixed in the sealing materials 8 and conductively connect wires of the first substrate 7a side and wires of the second substrate 7b side.

In FIG. 2, only one conductive material 23 is included in the cross sectional surface of the sealing material 8. However, it should be noted here that this is a measure of convenience for simply showing the cross sectional surface structure of the liquid crystal panel 2. Actually, the grain diameter of the conductive material 23 is considerably smaller than the cross sectional surface width of the sealing material 8 and a plurality of conductive materials 23 exist in the cross sectional surface of the sealing material 8.

The first substrate 7a has a transparent base material 13a having a rectangular shape when viewed from the Z axis direction formed by glass, plastic, or the like. First electrodes 17a are formed on the liquid crystal side surface of the base material 13a (+Z side surface in FIG. 2) by ITO (Indium Tin Oxide) or the like and an aliment layer 18a is formed thereon by polyimide or the like. The surface of the aliment layer 18 is subjected to alignment treatment, for example, rubbing treatment for determining alignment of liquid crystal molecules in the liquid crystal layer 36 before bonding the first substrate 7a and the second substrate 7b.

Moreover, a polarizer 21a is attached on the outside surface of the base material 13a (−Z side surface in FIG. 2) by, for example, adhesion. The polarizer 21a has functions to transmit straight polarized light oriented in a certain direction and to prevent transmittance of the other polarized light by absorption, dispersion and the like.

The second substrate 7b opposing the first substrate 7a has a transparent base member 13b having a rectangular shape when viewed from the Z axis direction formed by glass, plastic, or the like. Color filters 34 are formed on the liquid crystal side surface of the base member 13b (−Z side surface in FIG. 2) and second electrodes 17b are formed thereon by ITO or the like, and an alignment layer 18b is formed thereon by polyimide or the like. The surface of the alignment layer 18b is also subjected to alignment treatment, for example, rubbing treatment for determining alignment of liquid crystal molecules in the liquid crystal layer 36 before bonding the first substrate 7a and the second substrate 7b.

Moreover, a polarizer 21b is attached on the outside surface of the base member 13b (+Z side surface in FIG. 2) by, for example, adhesion. The polarizer 21b has functions to transmit straight polarized light oriented in a certain direction different from the transmittance axis direction of the polarizer 21a of the first substrate 7a side and to prevent transmittance of the other polarized light by absorption, dispersion and the like.

The first electrodes 17a on the first substrate 7a are formed in a stripe manner as a whole by mutually disposing a plurality of straight electrodes in parallel as shown in FIG. 1. Moreover, the second electrodes 17b are formed in a stripe manner as a whole by mutually disposing a plurality of straight electrodes extending in the direction perpendicular to the first electrodes 17a in parallel. Note that in FIG. 1, the distance between the electrodes 17a and the distance between the electrodes 17b are widely illustrated, so that the numbers thereof are smaller than that of the real ones. Accordingly, in fact, more electrodes are formed in the liquid crystal panel 2.

In the embodiment, dot portions at which the first electrodes 17a and the second electrodes 17b cross are arranged in a matrix manner. In this case, one dot constitutes the minimum unit of display, that is, a display dot, and the whole viewing area is formed by arranging a plurality of the display dots in a matrix manner. Note that, one of the first electrodes 17a or the second electrodes 17b shall be dot electrodes and a switching element such as a TFD (Thin Film Diode) or the like may be provided on the dot electrodes. Herewith, a liquid crystal panel of an active matrix type can be constructed.

In FIG. 1, a plurality of terminals 41 and a plurality of wires are formed on a surface of the extending portion 9 of the first substrate 7a by the same material, for example, ITO at the same time of the formation of the first substrate 7a. Moreover, a driving IC 3 is mounted in a distal area of the terminals 41 and the wires 42 by using the ACF 4. As shown in FIG. 2, the ACF 4 is formed by dispersing a lot of conducting particles 44 in a resin 43 having properties such as thermoplastic property, thermosetting property, ultraviolet cure property, or the like.

The driving IC 3 is fixed to the extending portion 9 of the substrate 7a by the resin 43, and terminals of the driving IC 3, that is bumps 46 are conductively connected to the substrate side terminals 41 and the substrate side wires 42 by the conductive particles 44. Note that in FIG. 1, the first electrodes 17a of the first substrate 7a side are connected to the bumps 46 (see FIG. 2) of the driving IC 3 by directly extending on the extending portion 9 of the first substrate 7a to be the wires 42. On the other hand, the second electrodes 17b of the second substrate 7b side are conductively connected to the wires 42 formed at the first substrate 7a side through the conductive materials 23 dispersed in the sealing material 8 as shown in FIG. 2 and connected to the bumps of the driving IC 3 through the wires 42. Note that, an outer circuit (not shown) in which a control circuit for controlling the operation of the liquid crystal panel 2 is mounted is connected to the substrate side terminals 41.

In, FIG. 2, the color filters 34 have each pigment of R (red), G (green), B (blue) which are three elementary colors for the additive color mixing method in response to each display dot. The each pigment of R, G, and B are arranged in a predetermined arrangement, for example, a stripe arrangement, a delta arrangement, a mosaic arrangement, or the like and a black matrix is formed between each pigment. Each pigment of R, G, and B of three colors are gathered to form one pixel, and the viewing area is formed by arranging a plurality of the pixels in a matrix manner.

In FIG. 1, the light emitting device 6 includes light sources 11, a light guide body 12, two prism sheets 15 and 16, a diffusion sheet 19, a reflective film 37, and the like. The light source 11 is constituted by an LED as a point light source. The light guide body 12 has an approximately rectangular shape and the light introduced form the light sources 11 are to be emitted to the whole diffusion sheet 19 with the light guide body 12. The prism sheets 15 and 16 improve the luminance of the light emitted from the light guide body 12. A light shielding sheet (not shown) is provided between the prism sheet 16 and the liquid crystal panel 2 as needed. The light shielding sheet is formed in a frame manner in which an opening is formed at the center so as to correspond to at least the viewing area of the first substrate 7a. The light in the non-displaying region such as near the extending portion 9 and the like which does not contribute for display is shielded by the light shielding sheet.

Here, for example, the diffusion sheet 19, the two prism sheets 15 and 16, are disposed on a light emitting side surface (light emitting surface) 12b of the light guide body 12 in this order and the reflective film 37 is disposed opposite to the light emitting surface 12b of the light guide body 12. Further, the light guiding body 12, the diffusion sheet 19, the two prism sheets 15 and 16, and the reflective films 37 have approximately the same size.

A plurality of the light sources 11 are disposed in a surface opposing a light guiding surface 12a of the light guide body 12 with a predetermined distance in the X axis direction. Further, a plurality of light source arrays formed by the plurality of the light sources 11 arranged in the X axis direction are disposed in the Z axis direction with a predetermined distance. In FIG. 1, the number of light sources 11 included in one light source array should be four and the number of the light source arrays arranged in the Z axis direction should be two. However, the numbers are not restricted thereto.

In FIG. 3, among the plurality of the light source arrays arranged in the Z axis direction, a first light source array 11A of the upper column side (+Z side) is mounted on a first circuit substrate 51 and a second light source array 11B of the lower column side (−Z side) is mounted on a second circuit substrate 52. The first circuit substrate 51 and the second circuit substrate 52 are opposed with the first light source array 11A and the second light source array 11B interposed therebetween. The first circuit substrate 51 and the second circuit substrate 52 are, for example, mainly constituted by a base member having flexibility formed by polyimide resin or the like, and a plurality of wiring patterns 53 and 54 connected to each of the light sources 11 are formed on the surfaces. One ends of the wiring patterns 53 and 54 are connected to the outer circuit (not shown) and the other ends thereof are connected to light sources 11.

A plurality of light sources 11 included in the first light source array 11A are mounted on the lower surface 51F side (−Z side) of the first circuit substrate 51. The surface 51F of the first circuit substrate 51 on which the first light source array 11A is disposed is perpendicular to the light guiding surface 12a of the light guide body 12, and the light emitting surfaces of the light sources 11 provided perpendicular to the surface is opposed to the light guiding surface 12a of the light guide body 12. Moreover, an edge of the first circuit substrate 51 is adhered to an end of the upper surface 12b of the light guide body 12 to be fixed to the light guide body 12.

A plurality of light sources 11 included in the second light source array 11B are mounted on the upper surface 52F side (+Z side) of the second circuit substrate 52. The surface 52F of the second circuit substrate 52 on which the second light source array 11B is disposed is perpendicular to the light guiding surface 12a of the light guide body 12, and the light emitting surfaces of the light sources 11 provided perpendicular to the surface is opposed to the light guiding surface 12a of the light guide body 12. Moreover, an edge of the second circuit substrate 52 is adhered to an end of the lower surface 12c of the light guide body 12 to be fixed to the light guide body 12.

In FIG. 3, the first circuit substrate 51 and the second circuit substrate 52 shall be discrete circuit substrates. However, the substrates can be constituted by one end and other end of one circuit substrate. For example, the structure in FIG. 3 can be realize by mounting the light sources 11 of the first light source array 11A and the light sources 11 of the second light source array 11B on one circuit substrate, bending the surfaces on which the light source arrays 11A and 11B are disposed toward the light guiding surface 12a, adhering one end to the upper surface 12b of the light guide body 12, and adhering the other end to the lower surface 12c of the light guide body 12. The number of the components can be reduced and cost reduction can be achieved by mounting all of the light sources 11 on one circuit substrate.

In FIG. 2, when white color light is generated in the light sources 11, the light is introduced into the light guide body 12 from the light guiding surface 12a which is a side edge surface of the light guide body 12 formed by a transparent material, for example, such as plastic or the like. The light introduce into the light guide body 12 is emitted to the outside from the surface (light emitting surface) 12b opposing the liquid crystal panel 2 or the surface 12c opposite thereto when optical conditions are satisfied as propagating therein. Thereby surface light is emitted to the outside from the surface 12b or the surface 12c.

The surface light emitted from the surface 12b opposing the liquid crystal panel 2 is directly supplied into the liquid crystal panel 2. On the other hand, the surface like light emitted from the surface 12c opposite to the liquid crystal panel 2 is reflected at the reflective film 37 and thereafter supplied into the liquid crystal panel 2. Note that, an optical pathway converting oblique surface which is a convex or concave pattern is formed on each of the surface 12b and surface 12c of the light guiding body 12 as needed in order to enhance the emission efficiency of the light from the surface 12b and surface 12c, although omitted in FIGS. 1 and 2.

While light is supplied into the liquid crystal layer 36 in the above described manner, as for the liquid crystal panel 2, one of a scanning signal or a data signal is supplied to the first electrodes 17a and simultaneously the other one of the scanning signal or the data signal is supplied to the second electrodes 17b by control of the driving IC 3. Thereby the liquid crystal molecules in the liquid crystal layer 36 are controlled for each display dot, that is, controlled for each pixel, so that the light passing through the liquid crystal layer 36 is modulated for each display dot. Images such as characters, figures, graphics, etc. are displayed in the viewing area when the light modulated in such a manner is passed through the polarizer 21b.

As described above, in the liquid crystal device 1 of the embodiment, a plurality of light sources 11 are separately disposed in a plurality of rows on the light guiding surface 12a of the light guide body 12, so that bright display as compared with the conventional liquid crystal devices can be provided. Further, a plurality of light sources 11 are gathered in one place, so that reduction of space can be achieved. Further, by gathering the light sources in one place, the light sources 11 can be formed on one circuit substrate, and the number of the components can be reduced.

Second Embodiment

FIG. 4 is a diagram showing a second embodiment of the emitting device. In the light emitting device 61, the light sources 11 of the first light source array 11A and the light sources 11 of the second light source array 11B are mounted on one circuit substrate 55. The surface (mounting surface) 55F of the circuit substrate 55 on which the first light array 11A and the second light array 11B are disposed is opposed to the light guiding surface 12a of the light guide body 12, and the light emitting surfaces of the light sources 11 oriented opposite to the mounting surface 55F is opposed to the light guiding surface 12a of the light guide body 12. With the configuration, all of the light sources 11 are mounted on one circuit substrate 55, so that the number of the components can be reduced and cost reduction can be achieved.

Third Embodiment

Figure 5:
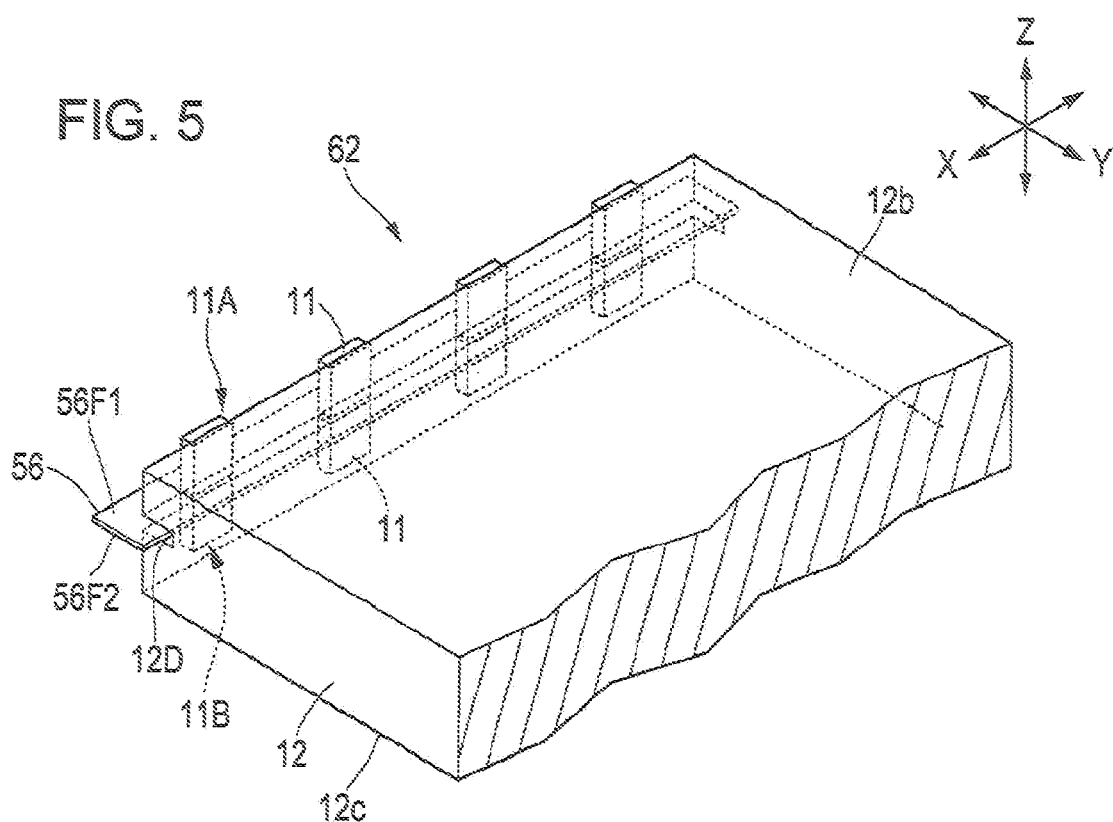
FIG. 5 is an enlarged fragmentary view of a light emitting device according to a third embodiment of the invention.

FIG. 5 is a diagram showing a third embodiment of the light emitting device. In the light emitting device 62, the light sources 11 of the first light source array 11A are mounted on the upper surface 56F1 side and light sources 11 of the second light source array 11B are mounted on the lower surface 56F2 side of one circuit substrate 56. The surface (first mounting surface) on which the first light source array 11A is disposed and the surface (second mounting surface) on which the second light source array 11B is disposed of the circuit substrate 56 are disposed perpendicular to the light guiding surface 12a of the light guide body 12 and the light emitting surfaces of the light sources 11 provided perpendicular to the surfaces are opposed to the light guiding surface 12a of the light guide body 12. Further, an edge of the circuit substrate 56 is adhered to the inner surface of a groove 12D provided on the light guiding surface 12a to be fixed to the light guide body 12. With the configuration, all of the light sources 11 are mounted on one circuit substrate 56, so that the number of the components can be reduced and cost reduction can be achieved.

Forth Embodiment

Figure 6:
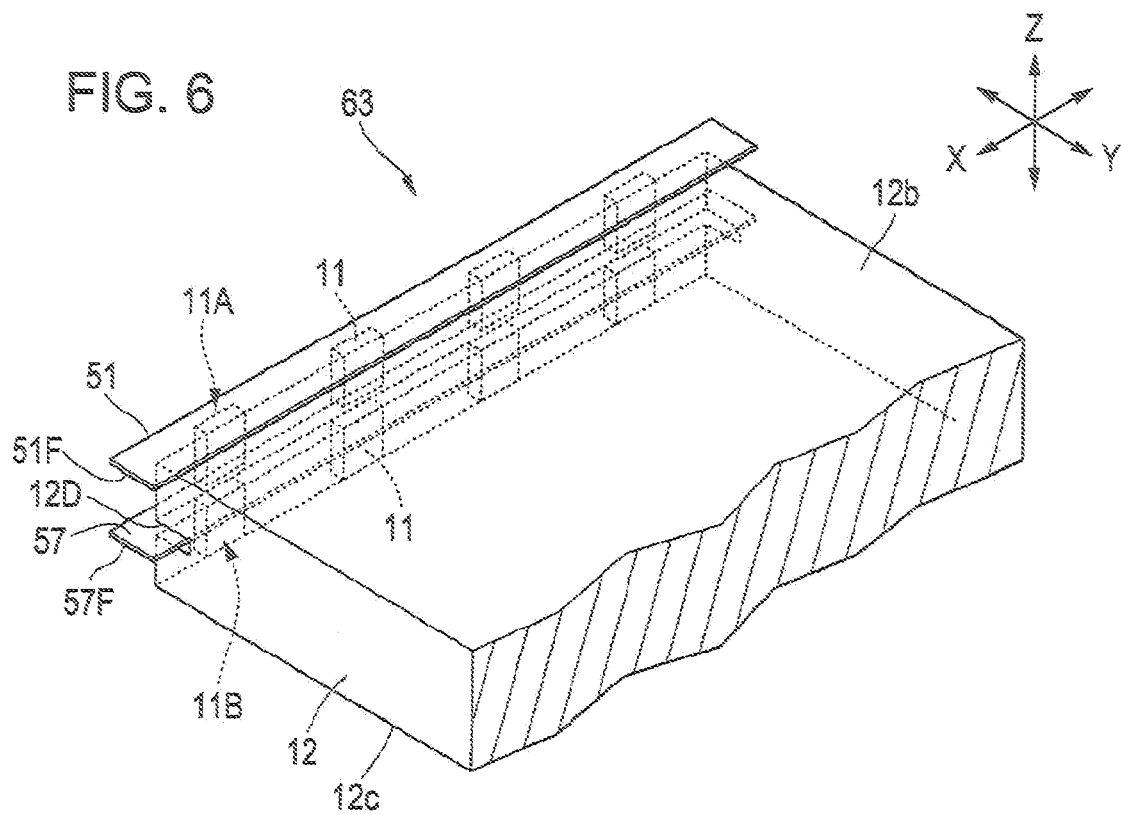
FIG. 6 is an enlarged fragmentary view of a light emitting device according to a fourth embodiment of the invention.

FIG. 6 is a diagram showing a forth embodiment of the light emitting device. In the light emitting device 63, the light sources 11 of the second light source array 11B are mounted on the lower surface 57F of the second circuit substrate 57.

The surface (mounting surface) 57F of the second substrate 57 on which the second light array 11B is disposed is disposed perpendicular to the light guiding surface 12a of the light guide body 12 and the light emitting surfaces of the light sources 11 provided perpendicular to the surface is opposed to the light guiding surface 12a of the light introducing body 12. Further, an edge of the second circuit substrate 57 is adhered to the inner surface of the groove 12D provided on the light guiding surface 12a to be fixed to the light guiding body 12.

The configuration is the same as that of the light emitting device 6 shown in FIG. 3 except the point that the surface 57F on which the second light source array 11B of the second circuit substrate 57 is disposed is provided on the lower surface side of the second circuit substrate 57. In the configuration, the surface 51F of the first circuit substrate 51 and the surface 57F of the second circuit substrate 57 on which the first light source array 11A and the second light source array 11B are disposed are respectively oriented in the same direction, so that, for example, when the surfaces 51F and 57F are limited to orient in the same direction due to a mounting problem, the configuration can be employed.

Fifth Embodiment

Figure 7:
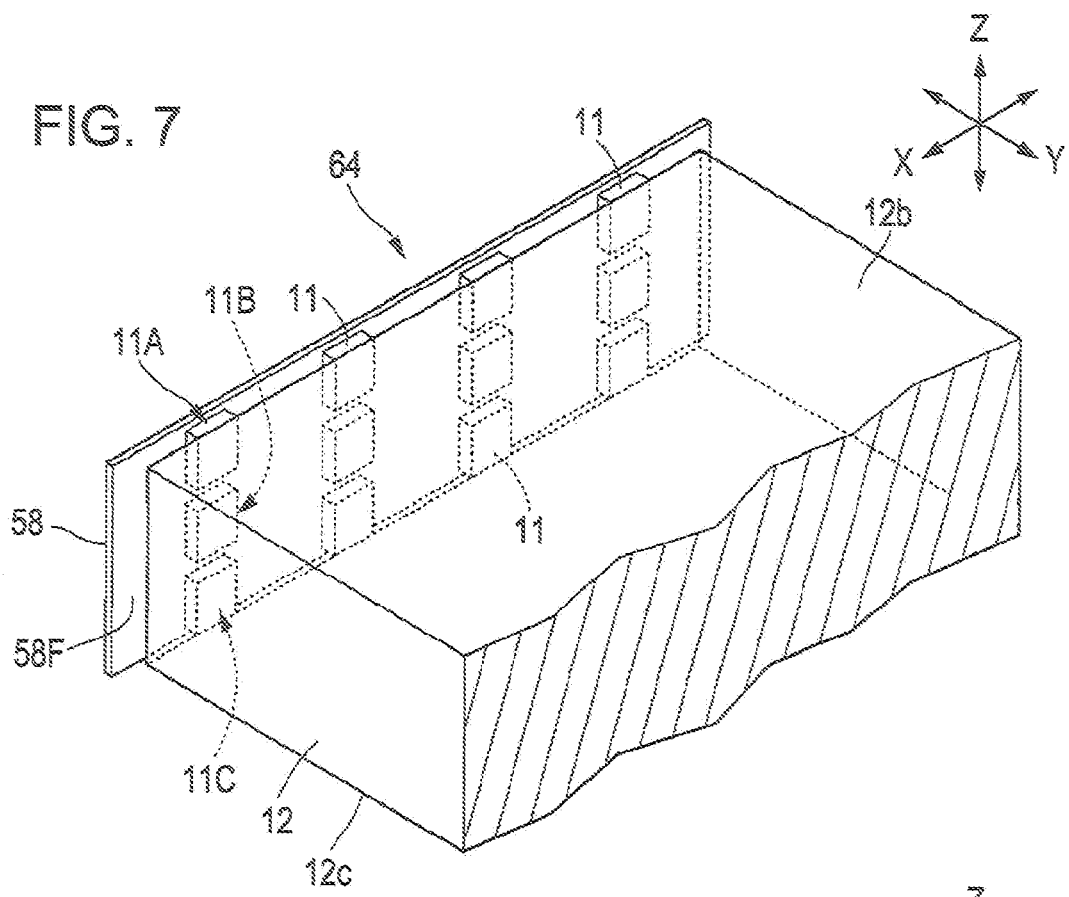
FIG. 7 is an enlarged fragmentary view of a light emitting device according to a fifth embodiment of the invention.

FIG. 7 is a diagram showing a fifth embodiment of the light emitting device. In the light emitting device 64, a first light source array 11A, a second source light array 11B, and a third source light array are disposed on the light guiding surface 12a of the light guide body 12 and the three rows of the light source arrays 11A, 11B, and 11C are mounted on one circuit substrate 58. The surface (mounting surface) 58F on which the light source arrays 11A, 11B, and 11C of the circuit substrate 58 is oppositely disposed to the light guiding surface 12a of the light guide body 12 and the light emitting surfaces of the light sources 11 oriented opposite to the mounting surface 58 are opposed to the light guiding surface 12a of the light guide body 12. With the configuration, the number of light source arrays is increased to three lows, so that further bright display can be provided. In addition, all of the light sources 11 are mounted on the one circuit substrate 58, so that the number of the components can be reduced and cost reduction can be achieved.

Sixth Embodiment

Figure 8:
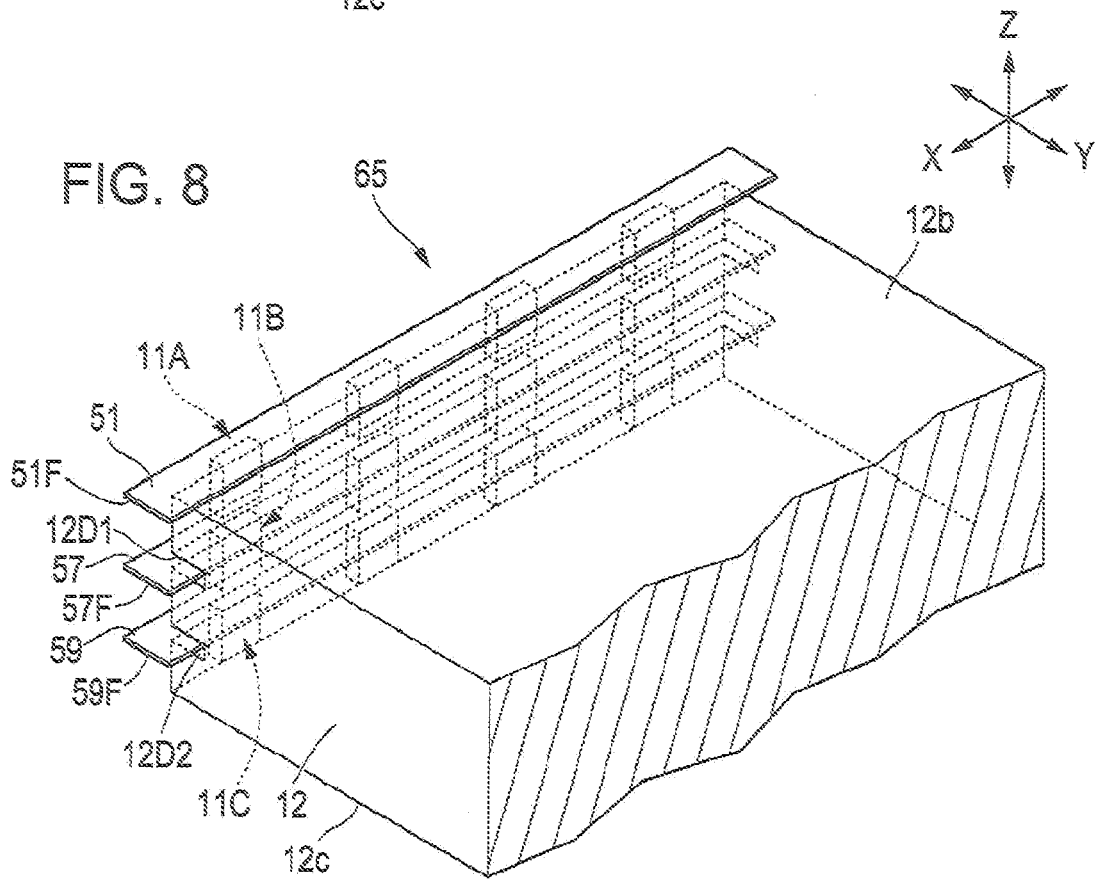
FIG. 8 is an enlarged fragmentary view of a light emitting device according to a sixth embodiment of the invention.

FIG. 8 is a diagram showing a sixth embodiment of the light emitting device. In the light emitting device 65, the first light source array 11A, the second light source array 11B, and the third light source array 11C are respectively mounted on the lower surface 51F of the first circuit substrate 56, the lower surface 57F of the second circuit substrate, and the lower surface 59F of the third circuit substrate. The surface (mounting surface) 57F of the second circuit substrate 57 and the surface (mounting surface) 59F of the third circuit substrate 59 on which the second light source array 11B and the third light source array 11C are disposed are disposed perpendicular to the light guiding surface 12a of the light guide body 12, and the light emitting surfaces of the light sources 11 provided perpendicular to the surfaces are opposed to the light guiding surface 12a of the light guide body 12. Further, edges of the second circuit substrate 57 and third circuit substrate 59 are respectively adhered to the inner surfaces of the grooves 12D1 and 12D2 provided on the light guiding surface 12a to be fixed to the light guiding body 12.

The configuration is the same as that of the light emitting device 63 in FIG. 6 except the point that the number of the light source arrays is increased to three rows. In the configuration, the surfaces 51F, 57F, and 59F of the first circuit substrate 51, the second circuit substrate 57, and the third circuit substrate 59 on which the first light source array 11A, the second light source array 11B, and the third light source array 11C are disposed are oriented in the same direction, so that, for example, when the surfaces 51F, 57F and 59F are limited to orient in the same direction due to a mounting problem, the configuration can be employed.

Seventh Embodiment

Figure 9:
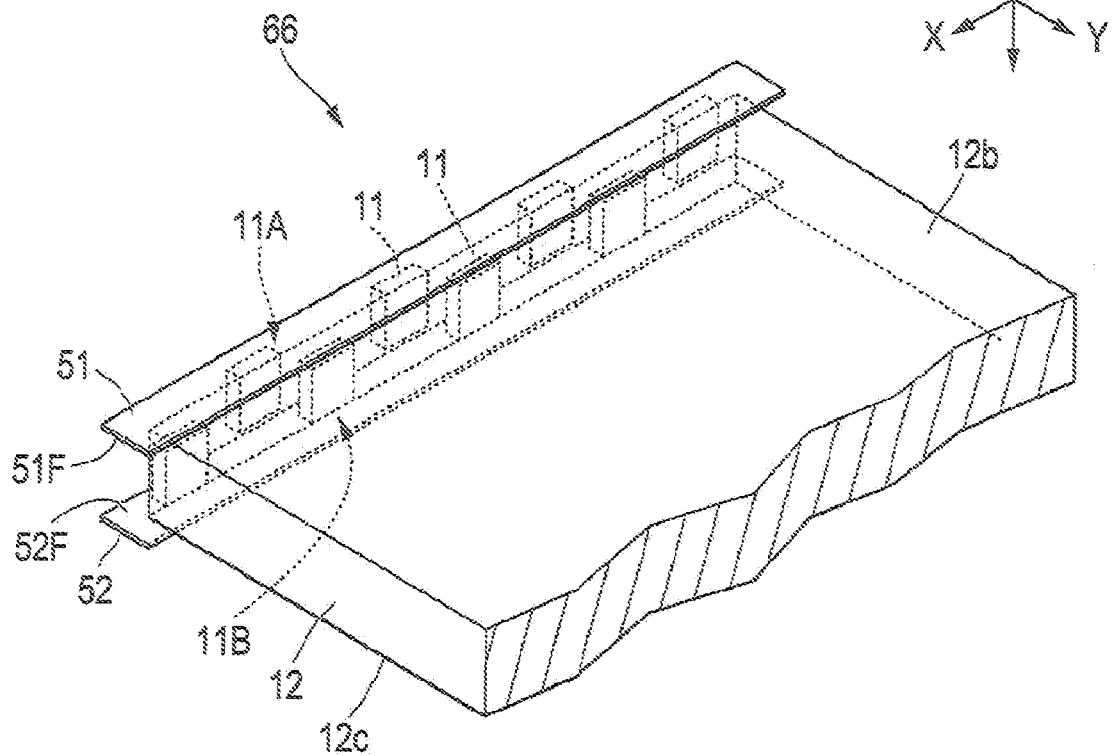
FIG. 9 is an enlarged fragmentary view of a light emitting device according to a seventh embodiment of the invention.

FIG. 9 is a diagram showing a seventh embodiment of the light emitting device. As shown in FIG. 9, in the light emitting device 66, the light sources 11 of the first light source array 11A are mounted on the lower surface 51F of the first circuit substrate 51 and the light sources 11 of the second light source array 11B are mounted on the upper surface 52F of the second circuit substrate 52. The first circuit substrate 51 and the second circuit substrate 52 are opposed with the first light array 11A and the second light source ally 11B interposed therebetween, and the first light source array 11A and the second light source array 11B are misaligned only by the half cycle in the arrangement cycle of the light sources 11. When viewed from the Z axis direction, the light sources 11 of the first light source array 11A and the light sources 11 of the second light source array 11B are disposed so as to be alternately misaligned in the arrangement direction of the light sources 11 and the optical axes of the light sources 11 do not overlap. In addition, when viewed from the X axis direction, the light sources 11 of the first light source array 11A and the light sources 11 of the second light source array 11B are disposed so as to be partly overlapped.

Figure 10:
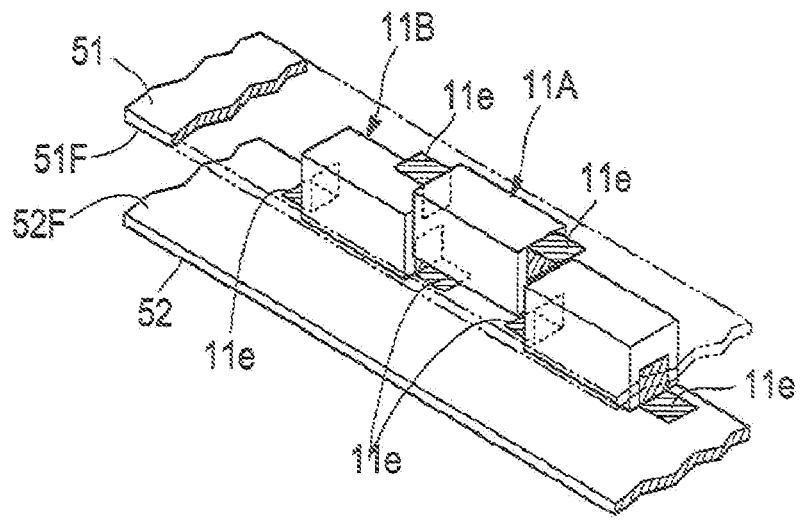
FIG. 10 is an enlarged fragmentary view of the light emitting device according to the seventh embodiment of the invention.

As shown in FIG. 10, electrodes 11e are provided for the light source 11 at (+X) side and (−X) side. The plurality of light sources 11 provided on the same circuit substrate are disposed at predetermined intervals so that the electrodes 11e do not interfere with each other. Further, the light sources 11 on the first circuit substrate 51 do not interfere with the electrodes 11e of the light sources 11 of the second circuit substrate 52. Accordingly, the light sources 11 on the first circuit substrate 51 and the light sources 11 on the second circuit substrate 52 are disposed as close as possible so as to overlap with the electrodes 11e of the light sources 11 on the respectively opposing circuit substrates when viewed from the Z axis direction.

With the configuration, as compared with the light emitting device 6 as shown in FIG. 3, the thickness of the light guide body 12 in the Z axis direction can be reduced. Further, the first light source array 11A and the second light source array 11B are disposed so that optical axes of the light sources 11 of the first light source array 11A and optical axes of the light sources 11 of the second light source array 11B do not mutually overlap. Accordingly, formation of a high luminance region due to overlapping of optical axes in the light guide body 12 is prevented and even illumination having little luminance unevenness in the whole light guide body can be provided. Further, as the electrodes 11e of the light sources 11 of the first light source array 11A and the electrodes 11e of the light sources 11 of the second light source array 11B do not interfere, the light sources 11 can be disposed as close as possible, which enables to enhance the disposal density of the light sources in the X axis direction as much as possible.

Electronic Apparatus

Figure 11:
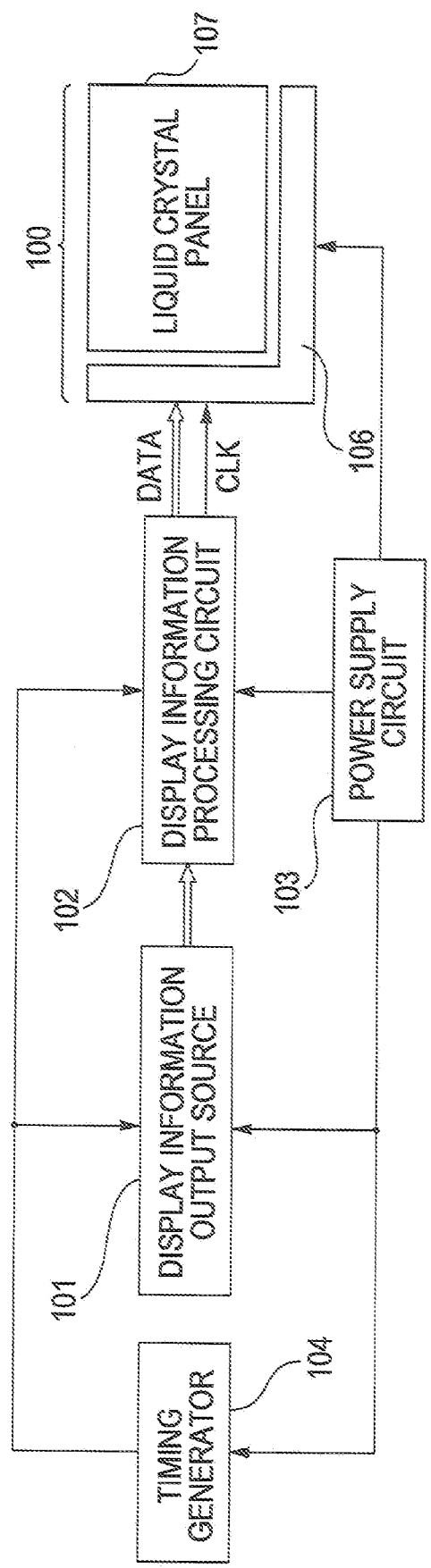
FIG. 11 is a diagram showing an example of an electronic apparatus equipped with the liquid crystal device of the invention.

FIG. 11 shows an embodiment in which the liquid crystal device according to the invention is used a display device of various types of electronic apparatuses. The electronic apparatus shown here includes a display information output source 101, a display information processing circuit 102, a power supply circuit 103, a timing generator 104, and a liquid crystal device 100. Further, the liquid crystal device 100 includes a liquid crystal panel 107 and a driving circuit 106. The liquid crystal device 1 descried below can be used as for the liquid crystal device 100.

The display information output source 101 includes a memory such as a RAM (Random Access Memory), a storage unit such as various types of discs, a tuning circuit for tuning and outputting digital image signals, and the like and supplies display information such as an image signal having a predetermined format to the display information processing circuit 102 according to a variety of clock signals generated by the timing generator 104.

The display information processing circuit 102 is equipped with a plurality of well-known circuits such as an amplifying and inverting circuit, a rotation circuit, a gamma correction circuit, and a cramp circuit. The display information processing circuit 102 processes the inputted display information and supplies image signals together with clock signal CLK to the driving circuit 106. Herein, the driving circuit 106 is the general term for a testing circuit and the like with a scanning line driving circuit (not shown) and a data line driving circuit (not shown). Further, the power source circuit 103 supplies a predetermined power supply voltage to each of the elements.

With the electronic apparatus, the liquid crystal device 1 shown in FIG. 1 is used as the liquid crystal device 100, so that the electronic apparatus which makes it possible to realize even and bright display can be provided.

As described above, the preferred embodiments according to the invention are described with reference to the accompanying drawings. However, it goes without saying that the invention is not limited to the embodiments. The shapes and the combinations of each constituting member shown in the above described embodiments are only examples, and it will be apparent that various changes can be made based on design requirement and the like without departing from the scope of the invention.

For example, in the above embodiments, the number of light source arrays disposed on the light guiding surface 12a should be two or three but the number may be four or more. Further, as for an example of the liquid crystal device of the invention, a simple matrix type liquid crystal device which does not use an active element or an active matrix type liquid crystal device using a two-terminal type switching element such as a TFD (Thin Film Diode) are exemplified. However, the invention can also be applied to an active matrix type liquid crystal device using a three-terminal type switching element such as a TFT (Thin Film Transistor). Further, a light emitting device for emitting a liquid crystal panel from rear side (back light) is exemplified as an example of the light emitting device of the invention. However, a light emitting device for emitting a liquid crystal panel from front side (front light) can also be applied in the invention.

What is claimed is:

1. A light emitting device comprising:
    a light source; and
    a light guide body for receiving light emitted from the light source from a light guiding surface to emit from a light emitting surface; wherein
    a plurality of light source arrays provided on the light guiding surface includes a first light source array and a second light source array, the first light source array is provided on a first circuit substrate, the second light source array is provided on a second circuit substrate, and the first circuit substrate and the second circuit substrate are opposed with the first light source array and the second light source array interposed therebetween, and
    an edge of the first circuit substrate is fixed on the light emitting surface of the light guide body and an edge of the second circuit substrate is fixed on the surface opposite to the light emitting surface of the light guide body.

2. The light emitting device according to claim 1, wherein the light sources of the first light source array and the light sources of the second light source array are alternately misaligning in an arrangement direction of the light sources.

3. The light emitting device according to claim 2, wherein the light sources of the first light source array and the light sources of the second light source array are disposed so as to be partly overlapped when viewed from the array direction of the light sources.

4. The light emitting device according to claim 1, wherein the first circuit substrate and the second circuit substrate are constituted by one circuit substrate.

5. A liquid crystal device including the light emitting device according to claim 1 and a liquid crystal panel oppositely disposed to the light emitting surface of the light emitting device.

6. A light emitting device comprising:
    a light source; and
    a light guide body for receiving light emitted from the light source from a light guiding surface to emit from a light emitting surface, wherein a plurality of light source arrays provided on the light guiding surface includes a first light source array and a second light source array, the first light source array is provided on one surface of one circuit substrate, and the second light source array is provided on the other surface of the one circuit substrate, and wherein an edge of the one circuit substrate is fixed to an inner surface of a groove provided on the light guiding surface of the light guide body.

7. A light emitting device comprising:
    a light source; and
    a light guide body for receiving light emitted from the light source from a light guiding surface to emit from a light emitting surface, wherein a plurality of light source arrays provided on the light guiding surface includes a first light source array and a second light source array, the first light source array is provided on a first circuit substrate, the second light source array is provided on a second circuit substrate, and the first light source array and the second light source array are opposed to each other with the second circuit substrate interposed therebetween, and wherein an edge of the first circuit substrate is fixed on the light emitting surface of the light guide body and an edge of the second circuit substrate is fixed to an inner surface of a groove provided on the light guiding surface of the light guide body.

* * * * *